(12) United States Patent
Zhu

(10) Patent No.: US 7,679,210 B2
(45) Date of Patent: Mar. 16, 2010

(54) VEHICLE WHEEL ELECTRICITY GENERATING DEVICE

(76) Inventor: Jiangbin Zhu, No. 34, Building 1, Chengsijiayuan, Weidong Street, Linghe District, Jinzhou City (CN) 121000

( * ) Notice: Subject to any disclaimer, the term of this patent is extended or adjusted under 35 U.S.C. 154(b) by 301 days.

(21) Appl. No.: 11/813,810

(22) PCT Filed: Jan. 12, 2006

(86) PCT No.: PCT/CN2006/000042

§ 371 (c)(1),
(2), (4) Date: Jul. 12, 2007

(87) PCT Pub. No.: WO2006/074606

PCT Pub. Date: Jul. 20, 2006

(65) Prior Publication Data

US 2008/0084071 A1    Apr. 10, 2008

(30) Foreign Application Priority Data

Jan. 12, 2005   (CN)  .................. 2005 1 0045659
Jul. 20, 2005   (CN)  .................. 2005 2 0091915 U

(51) Int. Cl.
  *B60K 1/00*    (2006.01)
  *F03D 9/00*    (2006.01)
(52) U.S. Cl. .................... 290/55; 290/1 R; 180/65.2
(58) Field of Classification Search ................ 290/1 R, 290/1 B, 39, 49, 44, 55, 1 A, 45; 180/65.5, 180/242
See application file for complete search history.

(56) References Cited

U.S. PATENT DOCUMENTS

| 4,429,232 | A | * | 1/1984 | Thomas et al. | ............. 290/1 R |
| 4,913,258 | A | * | 4/1990 | Sakurai et al. | ............. 180/242 |
| 5,355,039 | A | * | 10/1994 | Couture | .................... 310/67 R |
| 6,291,901 | B1 | * | 9/2001 | Cefo | .......................... 290/1 R |
| 6,470,933 | B1 | * | 10/2002 | Volpi | ....................... 152/152.1 |
| 6,885,111 | B2 | * | 4/2005 | Volpi | .......................... 290/1 R |
| 7,533,747 | B2 | * | 5/2009 | Heinen | .................... 180/65.51 |

FOREIGN PATENT DOCUMENTS

| CN | 1384587 A | 12/2002 |
| CN | 2638319 Y | 9/2004 |

OTHER PUBLICATIONS

International Search Report for PCT Application PCT/CN2006/000042 mailed Apr. 13, 2006.
English Abstract for Chinese Application with Publication No. 2638319, published on Sep. 1, 2004.
English Abstract for Chinese Application with Publication No. 1384587, published on Dec. 11, 2002.

* cited by examiner

*Primary Examiner*—Nicholas Ponomarenko
(74) *Attorney, Agent, or Firm*—Schwabe, Williamson & Wyatt

(57) ABSTRACT

A vehicle wheel electricity generating device for a automotive vehicle comprising a generator rotor winding (2) and a stator (4). A wind actuated component (3) is rotatably connected to a vehicle wheel (12), said rotor winding (2) is fixedly connected to the vehicle wheel (12), and said stator (4) is fixedly arranged on the wind actuated component (3). During the traveling of the automotive vehicle, the wind actuated component (3) rotates with respect to the vehicle wheel (12), such that the generator rotor winding (2) rotates with respect to the stator (4) to generate electricity.

9 Claims, 5 Drawing Sheets

VEHICLE WHEEL ELECTRICITY GENERATING DEVICE

FIELD OF INVENTION

The present invention relates to an electricity generating device, more specifically, to a vehicle wheel electricity generating device that makes use of vehicle wheels of a automotive vehicle to generate electricity.

BACKGROUND OF THE INVENTION

With continuous developments of electronic technologies, application of electronic technologies in vehicles becomes more popular and the intellectualized degree of vehicles becomes higher. Application of electronic technologies have entered into a tire which is a critical component of a vehicle, and the concept of an intellectualized tire has been proposed. A sensor and a communication transmitting device can be installed on a tire to measure various detected physical parameters and transmit them in real time to the central display or the consolidated alarming system in the vehicle cab, such that the system can detect and monitor the operation state of the tire, and can issue a warning once an abnormality occurs to prompt the driver to take immediate actions. A display device can also be directly installed in a tire to indicate its state.

The environments in which a tire operates are special in that the tire is always in a rotation state when the vehicle travels, in addition to the road environment and the weather environment. This causes some trouble to the electricity supply system and signal transmission, that is, ordinary electricity feeding and signal transmission via vehicle body wires are not applicable. The current tire detection systems mostly employ batteries to supply power and transmit signals by wireless. Its problems include the fact that the battery should be replaced regularly due to its endurance limitation, resulting in a troublesome operation and a high use-cost, and the fact that the output voltage of the batteries drops after a period of operation, thus affecting the supply effect.

SUMMARY OF THE INVENTION

The technical problem to be solved by embodiments of this invention may be to provide a vehicle wheel electricity generating device for an automotive vehicle, which may supply power to electronic apparatus on the wheel in time, with low use-cost, good power supply effect, energy saving and environment protection.

The above technical problem of the invention may be solved by the following technical solution, a vehicle wheel electricity generating device for an automotive vehicle, comprising a rotator winding of an electricity generator and a stator, wherein a wind actuated component may be rotatably connected to a vehicle wheel of an automotive vehicle, said generator rotator winding may be fixedly connected to the vehicle wheel, and said stator may be fixedly arranged on the wind actuated component in correspondence with the rotator winding, during the traveling of the automotive vehicle, the wind actuated component may rotate with respect to the vehicle wheel under the effect of the wind force or inertia, such that the generator rotator winding rotates with respect to the stator to generate electricity.

The leading-out terminal of the generator rotator winding in the invention may be the power output terminal of the vehicle wheel electricity generating device.

In the invention, said rotator winding may be arranged coaxially with the vehicle wheel, and said wind actuated component may be correspondingly arranged coaxially with the vehicle wheel.

In the invention, specifically, a base plate may be provided at the central position of the vehicle wheel, said rotator winding may be fixedly connected to the base plate, so as to be connected to the vehicle wheel via the base plate. Said base plate may form as a protective cover for the vehicle wheel.

Further, an installation frame may be fixedly connected to the base plate, and said base plate may be installed on the vehicle wheel via the installation frame.

As an alternative implement mode of the invention, said wind actuated component may comprise a rotary shaft rotatably supported at the central position of the vehicle wheel and a wind actuated rotary component fixedly connected to the rotary shaft.

In this implementation mode, said stator may be connected to the rotary shaft of the wind actuated component or to the wind actuated rotary component.

As another alternative implementation mode of the invention, said wind actuated component may comprise a supporting shaft which may be fixedly connected at the central position of the vehicle wheel and a wind actuated rotary component rotatably connected to the supporting shaft, with said stator being connected to the wind actuated rotary component to ensure the relative rotation between the stator and the rotator winding.

The wind actuated rotary component of the invention may be a wind vane, and during the traveling of the automotive vehicle, the wind vane may maintain substantially still with respect to the vehicle body under the wind force, so as to relatively rotate with respect to the vehicle wheel.

The wind actuated rotary component of the invention may be a wind wheel, and during the traveling of the automotive vehicle, the wind wheel may relatively rotate with respect to the vehicle wheel under the effect of the wind force or inertia. At the same time, the wind wheel may also function as an inertial flywheel.

Preferably, the rotation direction of said wind wheel may be opposite to the rotation direction of the vehicle wheel assumed when the automotive vehicle advances.

In the above vehicle wheel electricity generating device, said stator may be a permanent magnet or a stator winding.

By means of the above structure of the invention, during the traveling of the automotive vehicle, said rotator winding, entrained by the vehicle wheel, may rotate coaxially with the vehicle wheel, and the wind actuated component may make use of the moment of inertia of the vehicle wheel during the traveling and the aerodynamic forces to rotate with respect to the vehicle wheel. Thus, a relative motion may be produced between the rotator winding and the stator fixedly connected to the wind actuated component, such that the alternating magnetic field incises the generator rotator winding and electricity may be generated in the generator rotator winding. In this way, the leading-out terminal of the generator rotator winding may be conveniently connected to the electronic apparatus installed on the vehicle wheel, and power may be directly supplied to the electronic apparatus. Alternatively, the leading-out terminal of the generator rotator winding may be connected to a power storage device so as to charge it. As compared with the prior means in which power is supplied to the electronic apparatus via battery, the invention means may not only provide good power supply effect, but also may be of low use-cost, energy saving and environment protective.

BRIEF DESCRIPTION OF THE DRAWINGS

Embodiments of the disclosure will be readily understood by the following detailed description in conjunction with the accompanying drawings. Embodiments of the disclosure are illustrated by way of example and not by way of limitation in the figures of the accompanying drawings.

DETAILED DESCRIPTION OF SPECIFIC EMBODIMENTS

Figure 1:
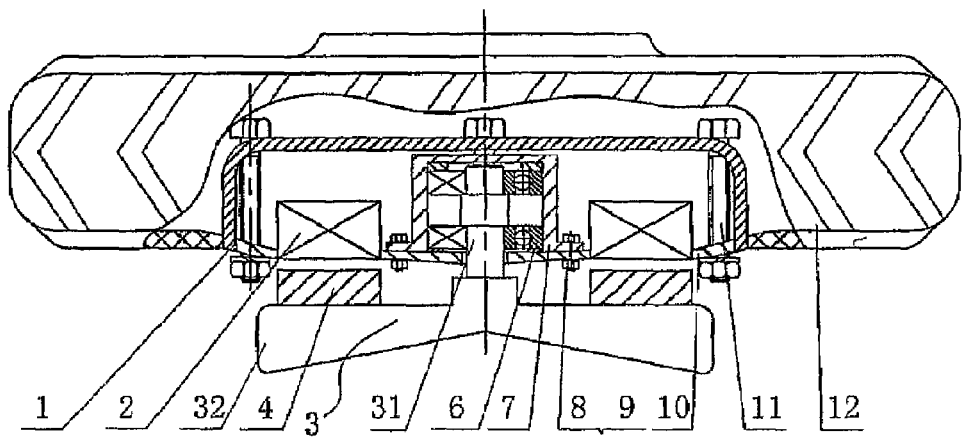
FIG. 1 is a schematic diagram of the structure of embodiment 1 of the present invention.

In the following detailed description, reference is made to the accompanying drawings which form a part hereof, and in which is shown by way of illustration embodiments of the disclosure. It is to be understood that other embodiments may be utilized and structural or logical changes may be made without departing from the scope of the disclosure. Therefore, the following detailed description is not to be taken in a limiting sense, and the scope of embodiments in accordance with the disclosure is defined by the appended claims and their equivalents.

As shown in FIGS. 1 to 8, a vehicle wheel electricity generating device for a automotive vehicle according to the present invention may includes a generator rotor winding 2 and a stator 4. A wind actuated component 3 may be rotatably connected to the vehicle wheel 12 and said generator rotor winding 2 may be fixedly connected to the vehicle wheel 12. Said stator 4 may be fixedly arranged on the wind actuated component 3, corresponding to the rotator winding 2. During the traveling of the automotive vehicle, the wind actuated component 3 may rotate relative to the vehicle wheel 12 under the wind force, so as to rotate the generator rotator winding 2 with respect to the stator 4 to generate electricity. The leading-out terminal of the generator rotator winding 2 may be the power output terminal of the vehicle wheel electricity generating device. In this way, the leading-out terminal of the generator rotator winding 2 may be conveniently connected to electrical apparatus installed on the vehicle wheel 12 such that power may be directly supplied to them. Alternatively, the leading-out terminal of the generator rotator winding 2 may be connected to the power storage device to charge it. Thus, the supply effect may be good, the use-cost may be low, the energy consumption may be low and an environment-friendly device may be obtained.

In the present invention, said rotator winding 2 may be preferably arranged coaxially with the vehicle wheel 12, and the wind actuated component 3 may also be correspondingly arranged coaxially with the vehicle wheel 12 so as to assure a stable rotation.

Specifically, in the present invention, a base plate 10 may be arranged in the central position of the vehicle wheel 12. Said rotator winding 2 may be fixedly connected to the base plate 10 so as to be connected to the vehicle wheel 12 via the base plate 10.

As shown in FIGS. 1 to 4, in the present invention, said base plate 10 may be formed as a protective cover for the vehicle wheel in the case where the vehicle wheel 12 has no protective cover.

Furthermore, depending on the structure of the vehicle wheel of the automotive vehicle, an installation frame 1 may be fixedly connected to the base plate 10 and the base plate 10 may be installed on the vehicle wheel 12 via this installation frame 1, as shown in FIGS. 1 to 8. Certainly, the base plate 10 may be directly installed on the vehicle wheel 12 without employing the installation frame 1 (not shown in figures). Specifically, the base plate 10 may be mounted on the installation frame 1 via a bolt 11, a nut 8 and a washer 9, as shown in FIG. 1.

The present invention will be explained in more details by describing a number of specific embodiments. These embodiments are for illustrative purposes only. It is to be understood that other embodiments may be utilized and structural or logical changes may be made without departing from the scope of the disclosure.

Embodiment 1

In this embodiment, said wind actuated component 3 may comprise a rotary shaft 31 rotatably supported in the central position of the vehicle wheel 12, and a wind actuated component fixedly connected to the rotary shaft 31. Specially, the wind actuated component may be a wind wheel 32 in this embodiment. Said stator 4 may be fixedly installed on the wind wheel 32, so as to form a floating rotator. At the same time, the wind wheel 32 serves as an inertial flywheel, and the rotation direction of the wind wheel 32 may be opposite to the traveling direction of the automotive vehicle.

Figure 2:
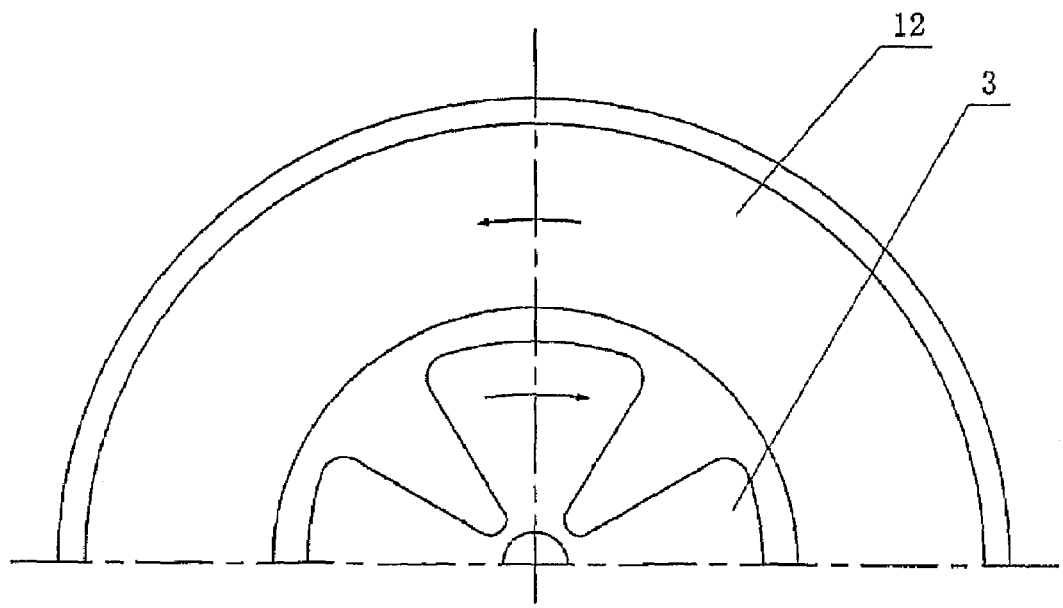
FIG. 2 is a schematic diagram showing the relative motion between a vehicle wheel and a wind wheel in embodiment 1 of the present invention.

As shown in FIG. 1 to 2, during installation, the installation frame 1 may be installed on the vehicle wheel 12 of the automotive vehicle via a bolt 11, and the shapes of the wind wheels on the right side and left side of the vehicle may be mirror-symmetric with each other. When the vehicle wheel 12 starts to rotate, the vehicle wheel 12 of the automotive vehicle may transform from standstill to a rotation state, resulting in an angular acceleration. At this point, the stator 4 may not keep up with the rotation of the vehicle wheel 12 immediately but with a rotation speed difference due to the effect of inertia, there may exist a relative rotation between the generator rotator winding 2 and the stator 4. Next, the generator rotator winding 2 may generate an induced voltage (or current) due to an alternating magnetic field. This relative rotation may be produced wherever the vehicle wheel 12 assumes an angular acceleration. When the vehicle travels at constant speed, the rotation of the vehicle wheel 12 may also be at a constant speed, therefore no angular acceleration exists. However, a relative motion of air may occur in the traveling direction of the vehicle at this time. The wind wheel 32, under the effect of aerodynamic forces, may generate a rotation torque which may be in the opposite direction to the rotation direction of the vehicle wheel 12, so as to cause a relative rotation between the stator 4 and the generator rotator winding 2, therefore the condition for generating electricity may be satisfied. The higher the vehicle speed, the higher the relative rotation speed may be. Thus, the leading-out terminal of the generator rotator winding 2 may be connected to the electronic apparatus installed on the vehicle wheel 12, and power may be directly supplied to the electronic apparatus. Alternatively, the generator rotator winding 2 may be connected to the power storage device so as to charge it.

In this embodiment, said rotary shaft 31 may be rotatably installed at the central position of the base plate 10 via a bearing 6 and a bearing cap 7, as shown in FIG. 1.

Embodiment 2

The basic structure of this embodiment may be identical to that of embodiment 1, therefore the description of this portion is omitted herein. One of ordinary skill will recognize that other embodiments of the invention are possible utilizing a basic structure differing from that of embodiment 1.

Figure 3:
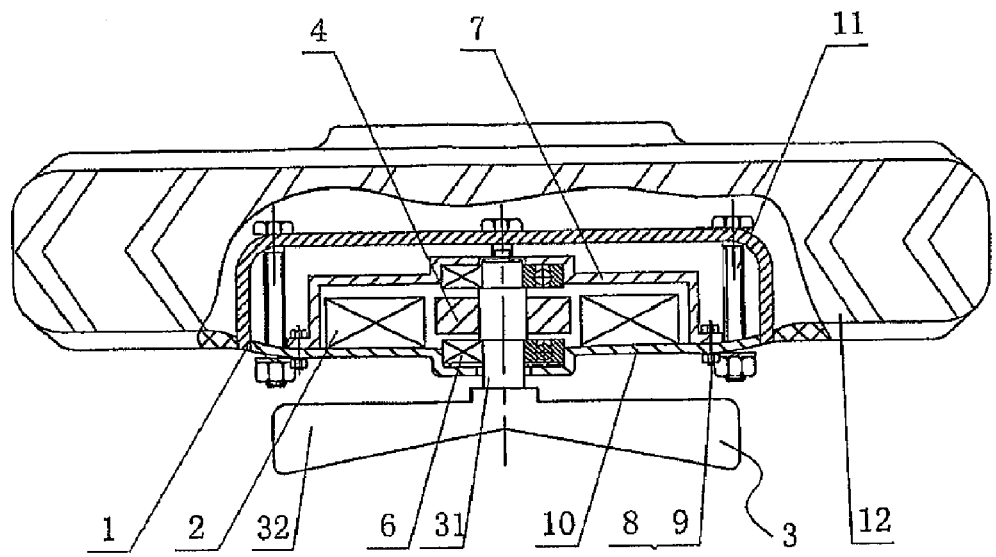
FIG. 3 is a schematic diagram of the structure of embodiment 2 of the present invention.

As shown in FIG. 3, this embodiment may differ, in part, from embodiment 1 in that, in this embodiment, the stator 4 may be fixedly connected to the rotary shaft 31 of the wind actuated component 3, and may be located inside of the rotator winding 2 and arranged in a manner circumferentially corresponding to the rotator winding 2.

In this way, during the traveling of the automotive vehicle, said rotator winding 2 may concentrically rotate with the vehicle wheel 12. The wind wheel 32 may rotate relative to the vehicle wheel 12 by means of the moment of inertia of the vehicle wheel 12 during the traveling and the aerodynamic forces, so as to cause a relative motion between the stator 4 on the rotary shaft 31 fixedly connected to the wind wheel 32 and the rotator winding 2. Thus, the alternating magnetic field incises the generator rotator winding 2, and the electricity may be generated in the generator rotator winding 2. Therefore, the leading-out terminal of the generator rotator winding 2 may be connected to the electronic apparatus installed on the vehicle wheel 12, and power may be directly supplied to the electronic apparatus. Alternatively, the generator rotator winding 2 may be connected to a power storage device so as to charge it.

Embodiment 3

Figure 4:
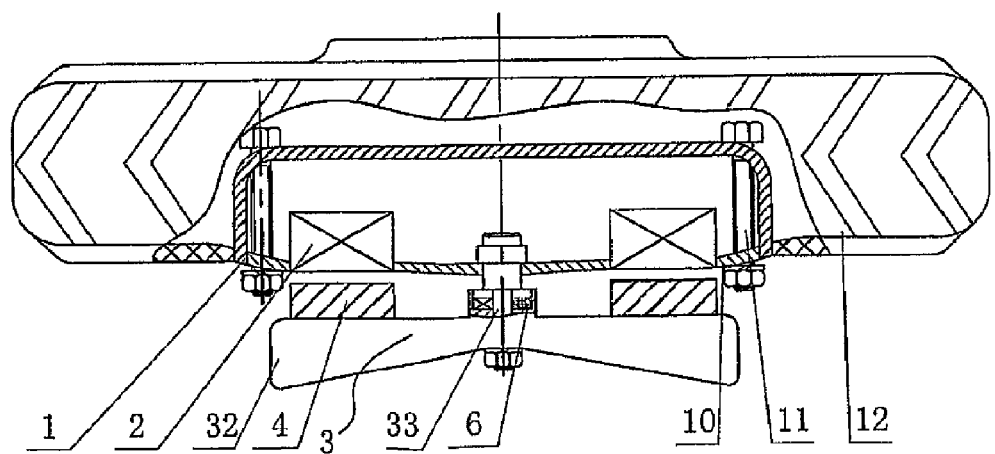
FIG. 4 is a schematic diagram of the structure of embodiment 3 of the present invention.

In the present embodiment, as shown in FIG. 4, said wind actuated component 3 may comprise a supporting shaft 33 fixedly connected at the central position of the vehicle wheel 12 and a wind actuated rotary component rotatably connected to the supporting shaft 33. This wind actuated rotary component may be identical to that of embodiment 1, and in particular, may be a wind wheel 32 in embodiments as well. At the same time, the wind wheel 32 may function as an inertial flywheel. In this embodiment, said stator 4 may be fixedly connected to the wind wheel 32 to ensure a relative rotation between the stator 4 and the rotator winding 2.

In this way, during the traveling of the automotive vehicle, said rotator winding 2 may concentrically rotate with the vehicle wheel 12. The wind wheel 32 may rotate relative to the vehicle wheel 12 by means of the moment of inertia of the vehicle wheel 12 during the traveling and the aerodynamic forces, so as to cause a relative motion between the stator 4 fixedly connected to the wind wheel 32 and the rotator winding 2. Thus, the alternating magnetic field incises the generator rotator winding 2, and the electricity may be generated in the generator rotator winding 2. Therefore, the leading-out terminal of the generator rotator winding 2 may be connected to the electronic apparatus installed on the vehicle wheel 12, and power may be directly supplied to the electronic apparatus. Alternatively, the generator rotator winding 2 may be connected to a power storage device so as to charge it.

Embodiment 4

Figure 5:
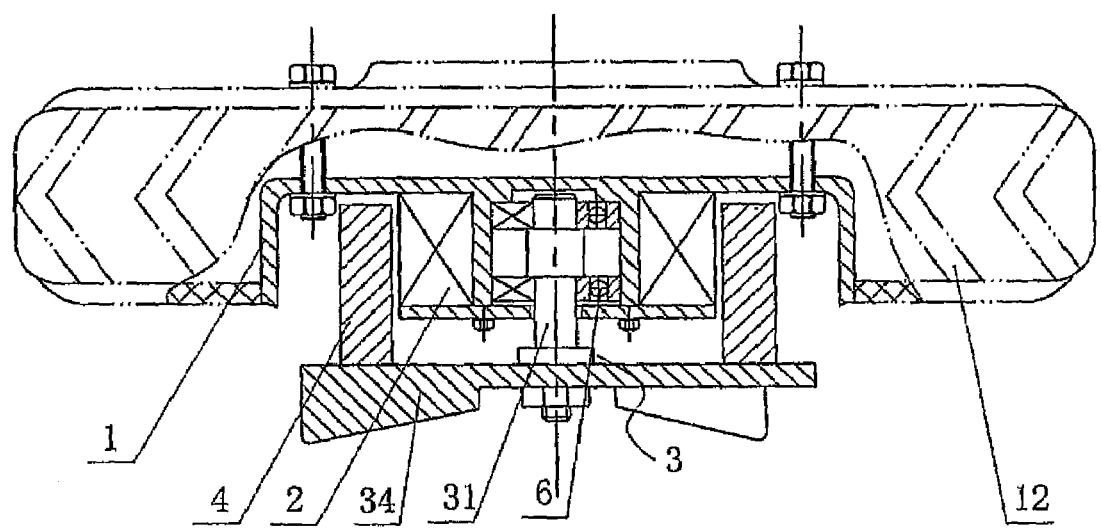
FIG. 5 is a schematic diagram of a first structure of embodiment 4 of the present invention.
Figure 6:
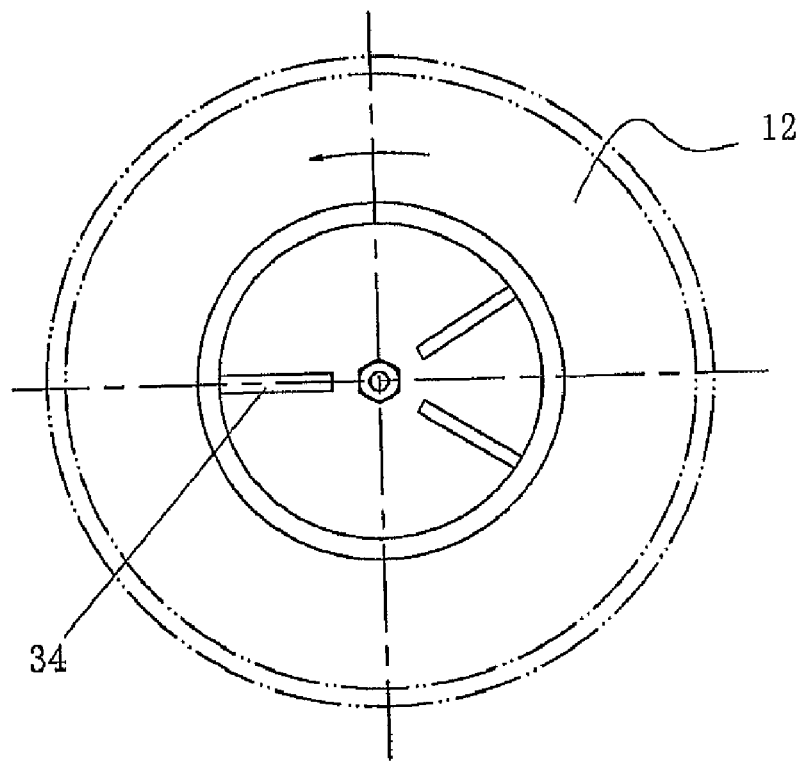
FIG. 6 is a bottom view of FIG. 5.
Figure 7:
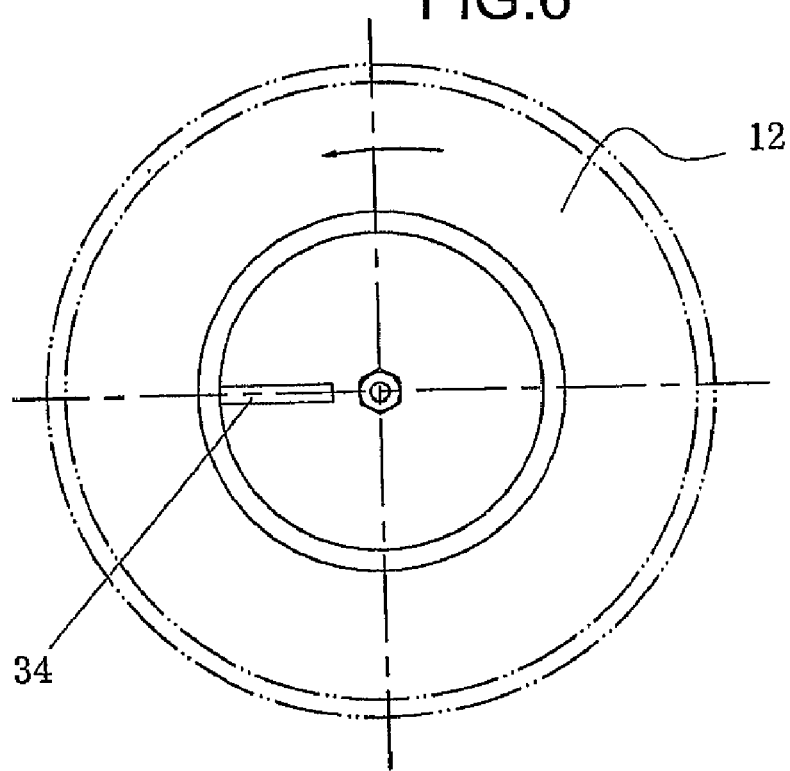
FIG. 7 is a schematic diagram of another structure of embodiment 4 of the present invention.

As shown in FIGS. 5 through 7, the basic structure of this embodiment may be identical to that of embodiment 1, although it need not be. Said wind actuated component 3 may also comprise a rotary shaft 31 rotatably supported at the central position of the vehicle wheel 12 and a wind actuated rotary component fixedly connected to the rotary shaft 31, with the stator fixedly connected to said wind actuated rotary component. This embodiment differs from embodiment 1 in that said wind actuated rotary component may be a wind vane 34 in this embodiment. During the traveling of the automotive vehicle, the wind vane 34 may maintain substantially still with respect to the vehicle body under the wind force, so as to relatively rotate with respect to the vehicle wheel 12. The wind vane 34 may be of one blade (as shown in FIG. 6) or of three blades (as shown in FIG. 7). Certainly, it may be of two blades or of more than three blades in various embodiments. Embodiments of the present invention are not limited in the number of blades utilized.

This embodiment may make use of the characteristic that the wind vane may substantially maintain a still state in the rotation direction under the effect of wind force. During the traveling of the automotive vehicle, said rotator winding 2 may concentrically rotate with the vehicle wheel 12. The wind vane 34 may maintain a substantial still state relative to the vehicle body by means of the moment of inertia of the vehicle wheel 12 during the traveling and the aerodynamic forces, so as to cause a relative motion between the stator 4 fixedly connected to the wind vane 34 and the rotator winding 2. Thus, the alternating magnetic field may incise the generator rotator winding 2, and the electricity may be generated in the generator rotator winding 2. Therefore, the leading-out terminal of the generator rotator winding 2 may be connected to the electronic apparatus installed on the vehicle wheel 12, and power may be directly supplied to the electronic apparatus. Alternatively, the generator rotator winding 2 may be connected to a power storage device so as to charge it.

In this embodiment, since the stator 4 always maintains a still state with respect to the vehicle body during the traveling of the automotive vehicle, the voltage of the supplied power may be stable and the supplied power may be of high quality.

Embodiment 5

Figure 8:
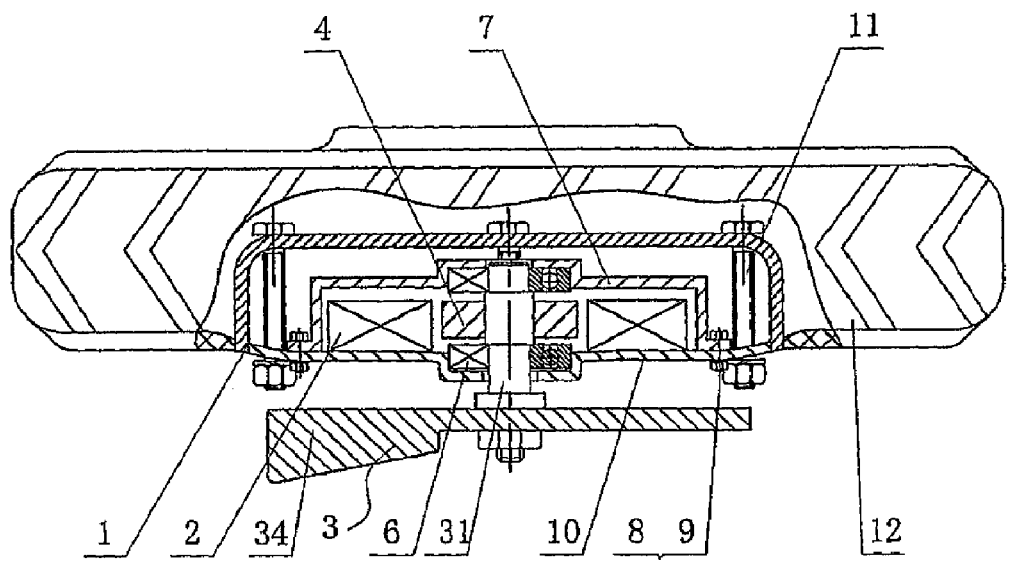
FIG. 8 is a schematic diagram of the structure of embodiment 5 of the present invention.

As shown in FIG. 8, the basic structure of this embodiment may be identical to that of embodiment 4, but it need not be. Said wind actuated component 3 may also comprise a rotary shaft 31 which may be rotatably supported at the central position of the vehicle wheel 12 and a wind actuated rotary component which may be fixedly connected to the rotary shaft 31, with said wind actuated component being a wind vane 34. This embodiment may differ from embodiment 4 in that said stator 4 may be fixed to the rotary shaft 31 in this embodiment.

This embodiment may make use of the characteristic that the wind vane may substantially maintain a still state in the rotation direction under the effect of the wind force. During the traveling of the automotive vehicle, said rotator winding 2 may concentrically rotate with the vehicle wheel 12. The wind vane 34 may maintain a substantial still state relative to the vehicle body by means of the moment of inertia of the vehicle wheel 12 during the traveling and the aerodynamic forces, such that the rotary shaft 31 fixedly connected to the wind vane 34 may maintain a still state with respect to the vehicle body as well, thereby causing a relative motion between the stator 4 fixedly connected to the rotary shaft 31 and the rotator winding 2. Thus, the alternating magnetic field may incise the generator rotator winding 2, and the electricity may be generated in the generator rotator winding 2. Therefore, the leading-out terminal of the generator rotator winding 2 may be connected to the electronic apparatus installed on the vehicle wheel 12, and power may be directly supplied to the electronic apparatus. Alternatively, the generator rotator winding 2 may be connected to a power storage device so as to charge it.

Embodiment 6

Figure 9:
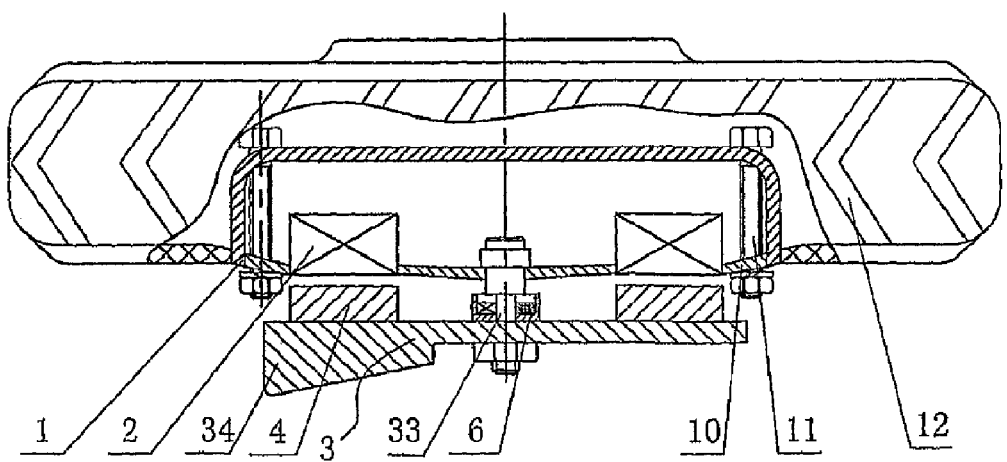
FIG. 9 is a schematic diagram of the structure of embodiment 6 of the present invention.

As shown in FIG. 9, the basic structure of this embodiment may be identical to that of embodiment 3, though it need not be. Said wind actuated component 3 may comprise a supporting shaft 33 fixedly connected at the central position of the vehicle wheel 12 and a wind actuated rotary component rotatably connected to the supporting shaft 33, with said stator 4 fixedly connected to the wind actuated component 3. This embodiment may differ from embodiment 3 in that said wind actuated rotary component may be a wind vane 34. During the traveling of the automotive vehicle, the wind vane 34 may substantially maintain a still state with respect to the vehicle body under the wind force, so as to produce a relative rotation with respect to the vehicle wheel 12.

This embodiment may make use of the characteristic that the wind vane may substantially maintain a still state in the rotation direction under the wind force. During the traveling of the automotive vehicle, said rotator winding 2 may concentrically rotate with the vehicle wheel 12. The wind vane 34 may maintain a substantial still state relative to the vehicle body by means of the moment of inertia of the vehicle wheel 12 during the traveling and the aerodynamic forces, so as to cause a relative motion between the stator 4 which may be fixedly connected to the wind vane 34 and the rotator winding 2. Thus, the alternating magnetic field may incise the generator rotator winding 2, and the electricity may be generated in the generator rotator winding 2. Therefore, the leading-out terminal of the generator rotator winding 2 may be connected to the electronic apparatus installed on the vehicle wheel 12, and power may be directly supplied to the electronic apparatus. Alternatively, the generator rotator winding 2 may be connected to a power storage device so as to charge it.

In this embodiment, since the stator 4 may always maintain a still state with respect to the vehicle body during the traveling of the automotive vehicle, the voltage of the supplied power may be stable and the supplied power may be of high quality.

In the above vehicle wheel electricity generating device of the invention, said stator 4 may be a permanent magnet or a stator winding.

The above embodiments are several concrete implement modes of the invention. They are only intended to illustrate various embodiments of the invention, and not to limit embodiments of the invention to any particular embodiments or set of embodiments.

What is claimed is:

1. An electricity generating device comprising:
   a rotator winding of an electricity generator,
   a stator; and
   a wind actuated component rotatably connected to a vehicle wheel of an automotive vehicle;
   wherein said rotator winding is connected to the vehicle wheel, and said stator is arranged on the wind actuated component in correspondence with the rotator winding, the wind actuated component is rotatable with respect to the vehicle wheel under the effect of wind force or inertia generated by movement of the automotive vehicle, to cause the generator rotator winding to rotate with respect to the stator to generate electricity;
   wherein said wind actuated component comprises a wind vane, and wherein the wind vane is adapted to orient under the effect of the wind force generated by movement of the automotive vehicle.

2. The electricity generating device of claim 1, wherein said rotator winding is arranged coaxially with the vehicle wheel, and said wind actuated component is correspondingly arranged coaxially with the vehicle wheel.

3. The electricity generating device of 1, wherein said rotator winding is connected to a base plate provided at a central position of the vehicle wheel, the rotator winding connected to the vehicle wheel via the base plate.

4. The electricity generating of claim 3, wherein said base plate forms a protective cover for the vehicle wheel.

5. The electricity generating device of 3, wherein an installation frame is connected to the base plate, and said base plate is installed on the vehicle wheel via the installation frame.

6. The electricity generating device of claim 1, wherein said wind actuated component further comprises a rotary shaft which is supported at a central position of the vehicle wheel, and the wind actuated rotary component is connected to the rotary shaft.

7. The electricity generating of claim 6, wherein said stator is connected to either the rotary shaft of the wind actuated component or to the wind actuated rotary component.

8. The electricity generating device of claim 1, wherein said wind actuated component further comprises a supporting shaft connected at acentral position of the vehicle wheel, and the wind actuated rotary component is connected to the supporting shaft, with said stator being connected to the wind actuated rotary component.

9. The electricity generating device of claim 1, wherein said stator is a permanent magnet or a stator winding.

* * * * *